United States Patent [19]

Nagaoka et al.

[11] Patent Number: 5,478,878
[45] Date of Patent: Dec. 26, 1995

[54] THERMOPLASTIC COMPOSITION

[75] Inventors: Kenji Nagaoka; Hiroshi Hagimori; Yasuro Suzuki; Takashi Sanada, all of Chiba, Japan

[73] Assignee: Sumitomo Chemical Company, Limited, Osaka, Japan

[21] Appl. No.: 117,741

[22] Filed: Sep. 8, 1993

Related U.S. Application Data

[63] Continuation of Ser. No. 868,289, Apr. 14, 1992, abandoned.

[51] Int. Cl.$^6$ ............................................. C08K 3/22
[52] U.S. Cl. .................... 524/430; 524/420; 524/432; 524/433; 524/538
[58] Field of Search ........................... 524/430, 420, 524/432, 433, 538

[56] References Cited

U.S. PATENT DOCUMENTS

| | | | |
|---|---|---|---|
| 4,493,915 | 1/1985 | Lohmeijer | 524/87 |
| 4,504,613 | 3/1985 | Abolins | 524/420 |
| 4,525,508 | 6/1985 | Lee | 524/432 |
| 4,873,276 | 10/1989 | Fujii | 524/279 |
| 4,921,896 | 5/1990 | Bonin | 524/432 |
| 5,055,494 | 10/1991 | Vander Meer | 521/61 |
| 5,115,010 | 5/1992 | Sakai | 524/433 |
| 5,124,391 | 6/1992 | Muehlbach et al. | 524/420 |
| 5,145,904 | 9/1992 | Muehlbach | 524/538 |
| 5,296,533 | 3/1994 | Nagaoka et al. | 524/430 |

FOREIGN PATENT DOCUMENTS

| | | |
|---|---|---|
| 108290 | 5/1984 | European Pat. Off. . |
| 310158 | 4/1989 | European Pat. Off. . |
| 375177 | 6/1990 | European Pat. Off. . |
| 948267 | 1/1964 | United Kingdom . |

OTHER PUBLICATIONS

Database WPI, Derwent Publications Ltd. Oct. 1990 abstract JO 2255 758.

Primary Examiner—Paul R. Michl
Assistant Examiner—John J. Guarriello
Attorney, Agent, or Firm—Cushman Darby & Cushman

[57] ABSTRACT

There is provided a polymer composition having improved discoloration resistance upon exposure to light comprising a polyphenylene ether, a polyamide, and a combination of (a), a inorganic filler selected from the group consisting of titanium oxide, zinc oxide, zinc sulfide, aluminum oxide, magnesium oxide, titanium oxide coated mica, and metal particles, and (b), an organic dye or pigment which bleaches upon exposure to light, in an amount effective to improve the discoloration resistance.

16 Claims, No Drawings

THERMOPLASTIC COMPOSITION

This is a continuation of application No. 07/868,289, filed on Apr. 14, 1992, which was abandoned on the filing hereof.

The present invention relates to a novel resin composition which comprises, (A) a polymer composition comprising a polyphenylene ether, optionally a styrene resin, a polyamide, optionally an impact strength improving polymer, and optionally an agent to improve the compatibility of the polyphenylene ether and the polyamide (hereinafter referred to as compatibilizer) and, (B) a combination of
   (a) at least one inorganic filler selected from the group consisting of titanium oxide, zinc oxide, zinc sulfide, aluminum oxide, magnesium oxide, titanium oxide coated mica, and metal particles,
   and,
   (b) at least one organic dye or pigment which bleaches upon exposure to light,
   in an amount effective to improve the discoloration resistance of the polymer composition (A).

The term polyphenylene ether is well known to those skilled in the art as a family of thermoplastic materials having excellent physical properties such as dimensional stability and high glass transition temperature, and they are made by a variety of processes from the corresponding phenols. Some of the polyphenylene ethers are disclosed in the patent literature, e.g., U.S. Pat. Nos. 3,306,874, and 3,573,257 and the like.

Blends of a polyphenylene ether and a styrene resin are also well known in the art and are disclosed in the prior art patent literature, e.g., U.S. Pat. Nos. 3,383,435, 3,658,495 and the like. Blends of a polyphenylene ether and a polyamide have also long been well known in the art, and disclosed in numerous patent literature. U.S. Pat. No. 3,379,792, for example, teaches the processability of a polyphenylene ether can be improved by incorporating therein up to 25% by weight of a polyamide.

Compatibilized blends of a polyphenylene ether and a polyamide are also well known in the art and disclosed in the prior art patent literature. U.S. Pat. No. 4,315,086 teaches the use of liquid diene polymer, epoxy compounds, and compounds having in the molecule both (a) a carbon-carbon double bond or a carbon-carbon triple bond and (b) a carboxylic acid, acid anhydride, acid amide, imide, carboxylic acid ester, amino or hydroxyl group, as compatibilizers. U.S. Pat. No. 4,659,763 teaches the use of quinone compounds, U.S. Pat. No. 4,600,741 teaches the use of trimellitic anhydride acid chloride, WO85/95372 teaches the use of a certain class of dicarboxylic acids such as citric acid, and WO87/9728 teaches the use of vinyltrimethoxy silane, as compatibilizers. While the above mentioned polyphenylene ether/polyamide blends exhibit improved melt flow property, improved chemical resistance, and if compatibilized by s compatibilizer, excellent mechanical properties, they have one big drawback that they can be easily discolored upon exposure to light. Further, the discoloring can be observed even in case of fabricated articles therefrom which surface is coated by a paint coat layer depending on the thickness and color of the paint coat layer.

The use of an organic dye or pigment in polymer blends for the purpose of reducing the discoloration thereof upon exposure to light are disclosed in some patent literature. Japanese Kohkoku Pat. No. 85-58258 teaches the use of a dye such as Solvent Yellow 105, in polyethylene terephthalate compositions. U.S. Pat. No. 4,493,915 discloses a polymer blend comprising a polyphenylene ether, a dye selected from purple anthrapyridone and yellow quinophtalone, and titanium oxide.

The above prior arts, however, do not specifically relate to a polyphenylene ether/polyamide composition.

Blends of n polyphenylene ether and an inorganic filler are also well known in the art and are disclosed in the prior art patent literature.

U.S. Pat. No. 3,943,191, for example, discloses a polymer blend comprising a polyphenylene ether, a polystyrene and titanium oxide as a reinforcing agent, but does not relate to a polyphenylene ether/polyamide composition. U.S. Pat. No. 4,167,507 discloses a polymer blend comprising a polyphenylene ether, a polystyrene and a small amount of zinc sulfide and zinc oxide, but again floes not relate to a polyphenylene ether/polyamide composition. U.S. Pat. No. 4,318,636 discloses a polymer blend comprising a polyphenylene ether, a polystyrene and aluminum flake as an agent to give electromagnetic interference shielding characteristic thereto, but does not relate to a polyphenylene ether/polyamide composition.

It has now been discovered that the discoloration resistance of a polyphenylene ether/polyamide composition can be improved by incorporating a combination of (a) at least one inorganic filler selected from the group consisting of titanium oxide, zinc oxiside, zinc sulfide, magnesium oxide, aluminum oxide, titanium oxide coated mica and metal particles, and (b) at least one organic dye or pigment which bleaches upon exposure to light.

SUMMARY OF THE INVENTION

According to the present invention a polyphenylene ether/polyamide composition having improved resistance to discoloration upon exposure to light can be prepared by incorporating therein a combination of (a) at least one inorganic filler selected from the group consisting of titanium oxide, zinc oxide, sinc sulfide, magnesium oxide, aluminum oxide, titanium oxide coated mica, and metal particles, and (b) at least one organic dye or pigment which bleaches upon exposure to light, in an amount effective to improve the discloration resistance of the polyphenylene ether/polyamide composition.

In general the composition of the present invention can be prepared from (A) a composition comprising,
   (a) at least one polyphenylene ether and,
   (b) optionally a styrene resin and,
   (c) at least one polyamide and,
   (d) optionally one or more impact strength improving polymers and,
   (e) optionally one or more agents to improve the compatibility of the polyphenylene ether and the polyamide and,
(B) a combination of
   (a) at least one inorganic filler selected from the group consisting of titanium oxide, zinc oxide, zinc sulfide, aluminum oxide, magnesium oxide, titanium oxide coated mica and metal particles and,
   (b) at least one organic dye or pigment which bleaches upon exposure to light
in an amount effective to improve the discoloration resistance of the polymer composition (A).

In the preparation of the polymer composition according to the present invention, the ratio between a polyphenylene ether and a polyamide is preferably from about 5% to about 95%, more preferably from about 10% to about 70%, most preferably from about 20% to about 60% by weight of the polyphenylene ether and supplementally the balance being a polyamide. When employed, a styrene resin may be incorporated substituting a portion of the polyphenylene ether. When employed, one or more impact strength improving polymers can be used in an amount of from about 2 to 50 parts, preferably from about 5 to about 30 parts by weight based on 100 parts by weight of the polyphenylene ether and the polyamide.

When employed, one or more compatibilizers can be used in an amount of from about 0.01 to 30 parts, preferably from about 0.1 to 5 parts, furthermore preferably 0.1 to 1 parts by weight based on 100 parts by weight of the polyphenylene ether and the polyamide. The amount of an inorganic filler to be incorporated in the polymer composition according to the present invention varies depending on the particle size and the identity of the filler. In general, a filler having smaller particle size gives better discoloration resistance.

When employed, a metal particle is preferably used in an amount of from about 1 to about 10 parts, more preferably from about 2 parts to about 5 parts by weight based on 100 parts by weight of the polymer composition (A).

When employed, the inorganic fillers other than metal particles are used in an amount of preferably from about 3 to about 20 parts, more preferably from about 5 to 15 parts by weight based on 100 parts by weight of the polymer composition (A).

The preferred mean particle size of the inorganic fillers other than metal particles is about 1 micron or lower, and more preferred particle size is about 0.5 micron or lower. Examples of metal particles include aluminum flake, zinc flake and the like. Metal flakes having smaller diameter and higher aspect ratio are preferred. Preferred inorganic fillers are titanium oxide and aluminum flake.

The organic dye or pigment is used in an amount of preferably from about 0.00 to 5 parts by weight, more preferably from about 0.01 to about 1 parts by weight based on 100 parts by weight of the polymer composition (A). It should be understood that the use or type of the compatibilizer in the practice of the present invention is not critical in view of the fact that the objective of the present invention is not to improve the physical property of the polyphenylene ether/polyamide composition but to improve the discloration resistance of the composition.

Examples of organic pigment or dye which bleaches upon exposure to light include;

Color Index, Solvent Yellow 4, 16, 17, 28 30, 33, 34, 44, 58, 77, 82; Solvent Orange 1, 13, and 45; Solvent Red 52; Pigment Yellow 13, 83, 97, 98, 108, and 138; Pigment Orange 4, and the like.

DETAILED DESCRIPTION OF THE INVENTION

As used herein, the term "polyphenylene ether" means a polymer constituted of a recurring unit represented by the following general formula:

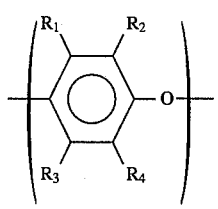

wherein R1, R2, R3 and R4 each represents identical or different group selected from the group consisting of hydrogen atom, halogen atom, hydrocarbon group, substituted hydrocarbon group, hydrocarbon-oxy group and substituted hydrocarbon-oxy group. Examples of the substituent in the substituted hydrocarbon group and substituted hydrocarbon-oxy group include thermally stable groups such as halogen atom, hydroxyl group, amino group, nitro group, cyano group, ester group, amide group, ether group, sulfide group, sulfone group and the like.

Concrete examples of the said polyphenylene ether resin include poly (2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dibutyl-1,4-pheneylene ether), and the like. Preferred polyphenylene ether is poly(2,6-dimethyl-1,4-phenylene ether).

Examples of the polyamides include polyhexamethylene adipamide (nylon 66), polyhexamethylene azelamide (nylon 69), polyhexamethylene sebacamide (nylon 610), polyhexamethylene dodecanoamide (nylon 612), poly-bis-(p-aminocyclohexyl) methane dodecanoamide, polytetramethylene adipamide (nylon 46) and polyamides produced by ring cleavage of a lactam such as polycaprolactam (nylon 6) and polylauryl lactam. Furthermore, there may be used polyamides produced by polymerization of at least two amines or acids used for the production of the abovementioned polymers, for example, polymers produced form adipic acid, sebacic acid and hexamethylenediamine. The polyamides further include blends of polyamides such as a blend of nylon 66 and nylon 6 including copolymers such as nylon 66/6.

Preferable crystalline polyamides in the present invention are nylon 46, nylon 6, nylon 66, nylon 11 and nylon 12. More preferred are nylon 6, nylon 66 and blends of nylon 66 and nylon 6 at an optional blending ratio.

Furthermore, those which have terminal functional groups excess in amine terminal groups, excess in carboxyl terminal groups or balanced in these groups, or mixtures of them at an optional ratio can be suitably used.

The aromatic polyamides that may be used in the present invention are copolyamides containing an aromatic component therein. The thermoplastic copolyamides containing aromatic component mean meltpolymerizable polyamides containing as a main component an aromatic amino acid and/or an aromatic dicarboxylic acid such as para-aminoethylbenzoic acid, terephthalic acid, and isophthalic acid.

Diamines which may constitute another component of the polyamide include hexamethylene-diamine, undecamethylanediamine, dodecamethylene-diamine, 2,2,4-/2,4,4-trimethylhexamethylenediamine, m-xylylenediamine, p-xylylenediamine, bis(p-amino-cyclohexyl)methane, bis(p-aminocyclohexyl)propane, bis(3-methyl-4-aminocyclohexyl)methane, 1,3-bis(aminomethyl)cyclohexane, and 1,4-bis(aminomethyl)cyclohexane. An isocyanate may also be used in place of the diamines. Examples of the isocyanate are 4,4'-diphenylmethane diisocyanate and tolylene diisocyanate.

Comonomers which are used, if necessary, have no limitation and examples of the comonomers are a unit of lactam, a unit of amino acid of 4–12 carbon atoms, a compound derived from an aliphatic dicarboxylic acid of 4–12 carbon atoms and an aliphatic diamine of 2–12 carbon atoms, for example, lactams and amino acids such as ε-caprolactam, ω-laurolactam 11-aminoundecanoic acid, and 12-aminododecanoic acid, and equimolar salts of the abovementioned various diamines and adipic acid, azelaic acid or sebacic acid.

Typical example of the thermoplastic aromatic copolyamides include copolymer polyamide of p-aminomethylbenzoic acid and ε-caprolactam (nylon AMBA/6), polyamides mainly composed of 2,2,4-/2,4,4- trimethylhexamethylenediamine•terephthalamide (nylon TMDT and Nylon TMDT/6I), polyamide mainly composed of hexamethylene diamine•isophthalamide and/or hexamethylenediamine•terephthalamide and containing, as another component, bis(p-aminocyclohexyl)methane•isophthalamide and/or bis(p-aminocyclohexyl)methane•terephthalamide, bis(p-aminocyclohexyl)propane•isophthalamide and/or bis(p-aminocyclohexyl)propane•terephthalamide, (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T).

The example of styrene polymers that may be employed in the present invention includes polystyrene, rubber modified polystyrene, styrene/acrylonitrile copolymer, styrene/methylmethacrylate copolymer, ABS resin, styrene/alphamethyl styrene copolymer and the like.

The impact strength improving polymers that may be employed in the present invention include olefinpolymers such as polyethylene, linear low density polyethylene, polyisobutylene, ethylene/propylene(polyene) copolymer rubber, ethylene/butene-1 copolymer rubber, ethylene/alkyl(meth)acrylate copolymers, ethylene/alkyl(meth)acrylate/maleic anhydride terpolymers, ethylene/glycidyl(meth)acrylate copolymer; styrene and conjugated diene block copolymers and hydrogenated derivatives thereof; styrene and/or unsaturated functional monomer grafted olefin polymers; and diene rubbers. The impact strength improving polymer may be used alone or in any combination. Examples of the agent to improve the compatibility of the polyphenylene ether and the polyamide, there may be given as follows:

a) liquid diene polymers, b) epoxy compounds, c) unsaturated functional compounds having in the molecule both (a) at least one carbon-carbon double bond or carbon-carbon triple bond and (b) at least one carboxylic acid, acid halide, acid anhydride, acid anhydride halide, acid amide, acid ester, imide, amino or hydroxyl group, (d) aliphatic polycarboxylic acid compounds or the derivatives thereof having both (a) a group represented by the formula-(OR) wherein R is hydrogen or an alkyl, aryl, acyl or carbonyl dioxy group and (b) at least two groups, each of which may be the same or different, selected from carboxylic acid, acid halide, acid anhydride, anhydride, acid anhydride halide, acid ester, acid amide, imide, amine and salts thereof, e) polyfunctional acid halide compounds having both (a) an acid halide group and (b) a group selected from carboxylic acid, carboxylic acid anhydride, acid ester and acid amide, Of these compatibilizers which belong to group c), unsaturated dicarboxylic acid or acid anhydride such as fumaric acid, itaconic acid, and maleic anhydride are preferred. Typical examples which belong to group d) include citric acid, malic acid, agaricic acid and the like. Typical examples which belong to group e) include trimellitic anhydride acid chloride, chloroformyl succinic anhydride and the like.

Examples of the organic dye or pigment which bleaches upon exposure to light used in the present invention are color Index (denoted as C.I. Solvent hereinafter) Solvent Yellow 4, C.I. Solvent Yellow 16, C.I. Solvent Yellow 17, C.I. Solvent Yellow 28, C.I. Solvent Yellow 30, C.I. Solvent Yellow 33, C.I. Solvent Yellow 34, C.I. Solvent Yellow 44, C.I. Solvent Yellow 58, C.I. Solvent Yellow 77, C.I. Solvent Yellow 82, C.I. Solvent Orange 1, C.I. Solvent Orange 13, C.I. Solvent Red 52, C.I. Solvent Orange 45, C.I. Solvent Green 5, C.I. Pigment Yellow 13, C.I. Pigment Yellow 83, C.I. Pigment Yellow 97, C.I. Pigment Yellow 98, C.I. Pigment Yellow 108, C.I. Pigment Yellow 138, C.I. Pigment Orange 4. Among these dyes or pigments, C.I. Solvent Yellow 44, C.I. Solvent Green 5 and C.I. Pigment Yellow 83 are preferable.

The foregoing polyphenylene ether/polyamide blends may further comprise fillers such as talc, aluminosilicate, mica, carbon black, glass fiber and the like, pigments, heat stabilizers, ultraviolet degradation inhibitors, antioxidants, flame retardants, plasticizers and the like.

The molded products obtained from the thermoplastic resin composition of the present invention can be used suitably for automobile parts and electrical and electronic parts.

As examples of automobile parts to which the composition of the present invention can be applied, mentioned may be made of exterior trim parts such as bumper, fender, apron, hood panel, fascia, rocker panel, rocker panel reinforce, floor panel, rear quarter panel, door panel, door support, roof top, and trunk lid, interior trim parts such as instrument panel, console box, glove box, shift knob, pillar garnish, door trim, handle, arm rest, wind louver, carpet, seat belt, and seat, interior parts of engine room such as distributor cap, air cleaner, radiator tank, battery case, radiator shroud, washer tank, cooling fan, and heater case, mirror body, wheel cover, trunk trim, trunk mat and the like. The following examples further illustrate the present invention, but are not intended to limit the scope of the present invention.

In the preparation of the polypheneylene ether/polyamide blends disclosed in the examples herein, a twin screw extruder TEM-50 made by Toshiba Kikai Kabusishiki Kaisha was used.

The extruder had L/D ratio of 36 and was equipped with a first feed opening at the position of L/D ratio of 1 and with a second feed opening at the position of L/D ratio of 18. (L: the length of the screw, D: the diameter of the screw)

The cylinder temperature was set at about 260° C. and screw speed was set at 300 rpm. The formulation of the individual blend is shown in Table 1. The degree of discoloration and notched izod impact strength at room temperature measured of each blend is also shown in Table-1.

The ingredients listed in the column "Feed-1" of Table-1 were fed from the first feed opening. The ingredients listed in the column "Feed-2" of Table-1 were fed from the second feed opening. All ingredients fed together either from the first feed opening or the second feed opening were mixed well by a tumbler mixer prior to the feeding.

The food rate of the first feed and the second feed were controlled by the automatic weight feed control system so as to maintain the formulation of the individual blend as specified in Table-1.

The polyphenylene ether employed in the examples was polyphenylene ether having a reduced viscosity of 0.46 dl/g, (hereinafter denoted as PPE) measured at 25° C. in a chloroform solution of 0.5 g/dl concentration manufactured by Nippon Polyether Kabushiki Kaisha.

The polyamide 6, if employed, was Unitika Kabushiki Kaisha's Nylon 6 A1030 BRL throughout the examples (hereinafter denoted as PA-6). The polyamide 66, if employed, was UBE Kosan Kabushiki kaisha's UBE nylon 66 2015B (hereinafter denoted as PA-66).

The aromatic polyamides in the examples, if employed, was Mitsubishi Gas Kagaku's Reny-6001 (hereinafter denoted as RENY).

The free radical initiator, if employed, was dicumyl peroxide, Sanperox® DCP made by Sanken Kako Kabushiki Kaisha. The free radical initiator, if employed, was always preblended with polyphenylene ether and fed from the first feed opening. Polyphenylene ether was always fed from the first feed opening and polyamides were always fed from the second opening.

The impact strength improving polymers used in the examples were as follows.

1) Styrene grafted EPDM denoted hereinafter as Sg-EPDM, if employed in any of the examples herein, contained about 75 weight % of EPDM (Sumitomo Kagaku's Esprene® 502) and about 25 weight % of polystyrene, of which about 7 weight % was ungrafted free polystyrene.

2) Styrene/acrylonitrile grafted EPDM denoted hereinafter as SAg-EPDM, if employed in any of the examples herein contained about 76 weight % of EPDM (Sumitomo Kagaku's Esprene® 502) and about 24 weight % of styrene/acrylonitrile copolymer containing about 5 weight % of acylonitrile.

3) Shell Kagaku's Kraton D1101, if employed in any of the examples, was used as a styrene butadiene triblock copolymer denoted hereinafter as SBS.

4) Shell Kagaku's Kraton G1651, if employed in any of the examples, was used as a hydrogenated styrene butadiene styrene triblock copolymer denoted hereinafter as SEBS.

Inorganic fillers used in the examples herein were as follows.

1) Aluminum flake:

Aluminum flake color concentrate manufactured by Sumika Color Kabushiki Kaisha, denoted as SPEM-SE408 containing 30 weight % of aluminum flake which particle size is about 5 microns, and about 70 weight % of polyethylene.

2) Titanium oxide-A

Titanium oxide made by Ishihara Sangyo Kabushiki Kaisha, Tipaque® R680 having mean particle size of 0.21 micron (hereinafter referred to as R-680).

3) Titanium oxide-B

Fine particle sized titanium oxide made by Tioxide Japan, UF-01 having mean particle size of about 0.018 micron (hereinafter referred to as UF-01)

4) Titanium oxide coated mica

Titanium oxide coated mica made by Merck & Co., Inc. having mean diameter of about 20 micron (hereinafter referred to as T.C.M.)

Organic dyes or pigments which bleach upon exposure to light, used in the examples herein were as follows;

1) Sumitomo Fast Yellow HRT (C.I. (colour index) Pigment Yellow 83) having the following structural formula made by Sumitomo Kagaku (hereinafter referred to as Dye-A)

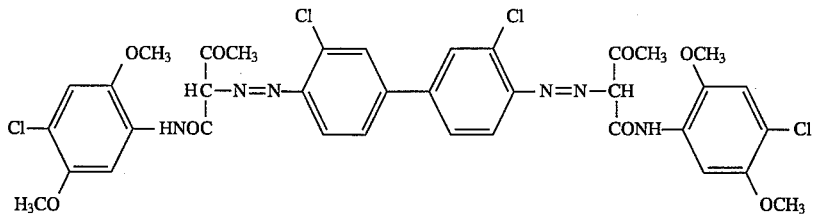

2) Sumiplast Yellow EL 7G (C.I. Solvent Green 5) having the following structural formula made by Sumitomo Kagaku (hereinafter referred to as Dye-B).

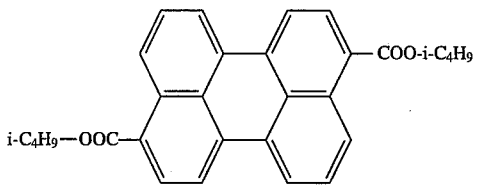

3) Diaresin Yellow 6G (C.I. Solvent Yellow-44) having the following structural formula made by Mitsubishi Kasei Kabushiki Kaisha (hereinafter referred to as Dye-C).

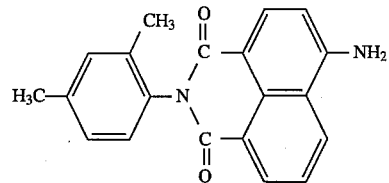

EXAMPLE 1

20 kg of PPE and 5 kg of SBS as prescribed in the Feed-1 column of Example-1 of Table-1, were premixed using a 100 liter tumbler mixer for 3 minutes, prior to feeding to the first feed opening of TEM-50 twin screw extruder. The premix prepared for the first feed opening will be referred to as the first feed premix hereinafter. 25 kg of PA-6 and 2.5 kg of SPEM-8E408 and 15 grams of Dye-C as prescribed in Feed-2 column of Example-1 of Table-1 using the tumbler mixer for 3 minutes prior to feeding to the second feed opening of TEM-50 twin screw extruder.

The premix prepared for the second feed opening will be referred to as the second feed premix hereinafter. The cylinder temperature of the extruder was set at about 260° C. and the screw speed at about 300 rpm.

The first feed premix was fed to the first feed opening and the second feed premix, to the second feed opening. The feed rate was adjusted to maintain the product out put rate at about 50 kg/Hr.

The resulting melt blend was cooled in a water bath by chilled water of about 10° C. and pelletized and dried. Thus prepared blend granules were injection molded to make two of 40 mm×40 mm×3 mm test plates.

The test plates were exposed to ultra violet rays having the wave length ranging from 290 to 459 nm and the intensity of 100 mW/cm2 for 69 hours at 63° C. using Eysper UV Tester manufactured by Iwasaki Denki Kabushiki Kaisha. After the exposure was completed, the degree of discoloration was measured of each plate using Macbeth Co., Ltd.'s spectrocolorimeter "Macbeth Color Eye MS-2020+", and ΔE was calculated according to the CIE 1966 color difference formula as follows:

$$\Delta E=[(\Delta L^*)^2+(\Delta a^*)^2+(\Delta b^*)2]^{1/2}$$

wherein $$\Delta L^*=L^*_{-1}-L^*_{-2}$$

$$\Delta a^*=a^*_{-1}-a^*_{-2}$$

$$\Delta b^*=b^*_{-1}-b^*_{-2}, \text{ and}$$

$L^*$-1, $a^*$-1, and $b^*$-1 are brightness, degree of red, and degree of yellow respectively, measured of each plate using the spectrocolorimeter prior to the exposure test, and $L^*$-2, $a^*$-2 and $b^*$-2 are ones measured of each plate after the exposure test. Average of ΔE of the two plastes is shown in Table-1.

Notched izod impact strength at room temperature was measured according to ASTMD-256 using 3.2 mm thickness test plates and is also shown in Table-1.

COMPARATIVE EXAMPLE-1

The experiments were conducted in the same manner as in Example-1 except that the aluminum flake was substituted with 1.5 kg of the grey pigment [PAM8E626 manufactured by Sumika Color K.K.], end that Dye-C was not incorporated.

COMPARATIVE EXAMPLE-2

The experiments were conducted in the same manner as in Example-1 except that Dye-C was not added in the second feed premix.

EXAMPLE-2

The experiments were conducted in the same manner as in Example-1 except that 0.2 kg of maleic anhydride and 20 grams of dicumyl peroxide, the free radical initiator were added in the first feed premix, and that SBS was substituted with Sg-EPDM.

EXAMPLE-3

20 Kg of PPE, 0.2 Kg of maleic anhydride, 20 grams of dicumyl peroxide as prescribed in the Feed-1 column of Example-3 were premixed in the same manner as in Example-1 to make the first feed premix. 25 Kg of PA-6, 5 Kg of SBS, 2.5 Kg of R-680 (titanium oxide) and 0.07 Kg of SHPA-817 (black color concentrate made by Sumika Color Kabushiki Kaisha containing about 40 weight % of carbon black and about 60 weight % of polystyrene), and 15 grams of Dye-C were premixed in the same manner as in Example-1 to make the second feed premix.

The first feed premix and the second feed premix were fed to the first feed opening and to the second feed opening respectively and extruded to make the product in the same manner as in Example-1. The resulting product was tested to measure ΔE and notched izod impact strength in the same manner as in Example-1. The result is shown in Table-1.

EXAMPLE-4

The experiments were conducted in the same manner as in Example-3 except that 5 Kg of R-680 (titanium oxide) was added instead of 2.5 Kg of R-680 in the second feed premix, and that the quantity of SHPA817 (black colour concentrate) was increased to 0.15 Kg from 0.07 Kg.

EXAMPLE-5

The experiments were conducted in the same manner as in Example-4 except that Dye-C was substituted with Dye B.

EXAMPLE-6

The experiments were conducted in the same manner as in Example-5 except that Dye-B was substituted with 300 grams of Dye-A.

EXAMPLE-7

The experiments were conducted in the same manner as in Example-2 except that PA-8 was substituted with PA-66, and Sg-EPDM with SAg-EPDM.

EXAMPLE-8

The experiments were conducted in the same manner as in Example-5 except that SBS was substituted with SEBS, and maleic anhydride with citric acid.

EXAMPLE-9

The experiments were conducted in the same manner as in Example-3 except that R-680 was substituted with 1.2 Kg of UF-01 (titanium oxide).

EXAMPLE-10

50 kg of gray pigmented Noryl GTX-600, a compatibilized PPE/PA blend made and sold by GE Plastics Japan, and 2.5 kg of R-680 (titanium oxide) and 15 grams of Dye-C were premixed by the tumbler mixer and then melt extruded using TEM-50 twin screw extruder feeding the premix to the first feed opening, to make the product granules.

The resulting granules were injection molded to make the 40 mm×40mm×3 mm test plates and the degree of discoloration was measured in the same manner as in the previous examples. Notched izod impact strength at room temperature was also measured as in the previous examples.

COMPARATIVE EXAMPLE-3

The same Noryl GTX600 was injection molded, without adding R-680 and Dye-C to make the test plates, and the degree of discoloration and notched izod impact strength at room temperature were measured. The result is shown in Table-I.

EXAMPLE-11

The experiments were conducted in the same manner as in Example-3 except that 20 Kg of PPE in the first feed premix was reduced to 15 Kg, and 25 Kg of PA-6 was substituted with 29 Kg of PA-6 and 1 Kg of RENY, and R-680 was substituted with 1.5 Kg of titanium oxide coated mica.

4) Finally, the non-extractable residue was dryed under vacuum at 100° C. for 5 hours and was weighed.

TABLE I

| Feed | Ingredient | Example 1 | 2 | 3 | 4 | 5 | 6 | 7 | 8 | 9 | 10 | 11 | Comparative Example 1 | 2 | 3 | 4 |
|---|---|---|---|---|---|---|---|---|---|---|---|---|---|---|---|---|
| Feed-1 | PPE (kg) | 20 | 20 | 20 | 20 | 20 | 20 | 20 | 20 | 20 | Noryl GTX 600 | 15 | 20 | 20 | Noryl GTX 600 | 20 |
|  | Dicumyl Peroxide (g) | — | 20 | 20 | 20 | 20 | 20 | 20 | 20 | 20 |  | 20 | 20 | — |  | 20 |
|  | SBS (kg) | 5 | — | — | — | — | — | — | — | — |  | — | 5 | 5 |  | — |
|  | MAH (kg) | — | 0.2 | 0.2 | 0.2 | 0.2 | 0.2 | 0.2 | — | 0.2 |  | 0.2 | — | — |  | 0.2 |
|  | Citric acid (kg) | — | — | — | — | — | — | — | 0.2 | — |  | — | — | — |  | — |
|  | Sg-EPDM (kg) | — | 5 | — | — | — | — | — | — | — |  | — | — | — |  | — |
|  | SAg-EPDM (kg) | — | — | — | — | — | — | 5 | — | — |  | — | — | — |  | — |
| Feed-2 | PA-6 (kg) | 25 | 25 | 25 | 25 | 25 | 25 | — | 25 | 25 | (50 g) | 29 | 25 | 25 |  | 25 |
|  | PA-66 (kg) | — | — | — | — | — | — | 25 | — | — |  | — | — | — |  | — |
|  | RENY (kg) | — | — | — | — | — | — | — | — | — |  | 1 | — | — |  | — |
|  | SBS (kg) | — | — | 5 | 5 | 5 | 5 | — | — | 5 |  | 5 | — | — |  | 5 |
|  | SEBS (kg) | — | — | — | — | — | — | — | 5 | — |  | — | — | — |  | — |
|  | SHPA817 (kg) | — | — | 0.07 | 0.15 | 0.15 | 0.15 | — | 0.15 | 0.15 |  | 0.15 | — | — |  | — |
|  | PAM8E626 (kg) | — | — | — | — | — | — | — | — | — |  | — | 1.5 | — |  | 1.5 |
|  | SPEM8E408 (kg) | 2.5 | 2.5 | — | — | — | — | 2.5 | — | — | — | — | — | 2.5 | — | — |
|  | R680 (kg) | — | — | 2.5 | 5 | 5 | 5 | — | 5 | — | 5 | — | — | — | — | — |
|  | UFO1 (kg) | — | — | — | — | — | — | — | — | 1.2 | — | — | — | — | — | — |
|  | T.C.M. (kg) | — | — | — | — | — | — | — | — | — | — | 1.5 | — | — | — | — |
|  | Dye-A (g) | — | — | — | — | — | 300 | — | — | — | — | — | — | — | — | — |
|  | Dye-D (g) | — | — | — | — | 15 | — | — | — | — | — | — | — | — | — | — |
|  | Dye-C (g) | 15 | 15 | 15 | 15 | — | — | 15 | 15 | 15 | 15 | 15 | — | — | — | — |
| ΔE |  | 4.2 | 4.1 | 3.6 | 2.0 | 1.8 | 2.8 | 3.9 | 2.1 | 4.5 | 3.0 | 3.2 | 18 | 9 | 15 | 16 |
| NE (wt %) |  |  |  |  |  |  |  |  |  |  |  |  | 0 |  | 12 | 16 |
| IZOD (kg · cm/cm) |  | 12 | 22 | 72 | 68 | 64 | 57 | 20 | 60 | 72 | 20 | 20 | 15 | 12 | 55 | 78 |

COMPARATIVE EXAMPLE-4

The experiments were conducted in the same manner as in Example-3 except that R-680 (titanium oxide) was substituted with 1.5 Kg of gray pigment, PAM8E625, and that Dye-C was not added.

<Extraction test>

In order to show the difference between a compatibilized PPE/PA blend and an uncompatibilized PPE/PA blend, the following extraction test was conducted, using the PPE/PA blends of Comparative example-1, Comparative example-3 (Noryl GTX-600) and Comparative example-4.

The weight percentage of non extractable (denoted as NE) measured of the three blends were shown in Table-1.

NE was calculated as follows;

$$NE = \frac{\text{Non extractable residue} - \text{inorganic filler}}{\text{total polymer composition}} \times 100$$

Procedure of Extraction Test:

1) 5 g of the pulverised each resin composition was extracted by Soxlehlet's extraction method using chloroform as extraction solvent for 9 hours.

2) Subsequently, the non-extractable residue was further extracted with 2, 2, 2-trifluoroethanol for 18 hours in the same manner as Step 1.

3) Subsequently, the non-extractable residue was extracted with chloroform again for 9 hours in the same manner as Step 1.

We claim:

1. A polymer composition which comprises
   (A) a polymer composition consisting of
      (a) at least one polyphenylene ether and,
      (b) optionally a styrene resin and,
      (c) at least one polyamide and,
      (d) optionally one or more impact strength improving polymers and,
      (e) one or more agents to improve the compatibility of the polyphenylene ether and the polyamide, and
   (B) a combination of
      (a) at least one inorganic filler selected from the group consisting of titanium oxide, zinc oxide, zinc sulfide, aluminum oxide, magnesium oxide, titanium oxide coated mica, and metal particles and,
      (b) at least one organic dye or pigment selected from the group consisting of Solvent Yellow 44, Solvent Green 5, Pigment Yellow 83, and Solvent Yellow 105, which bleaches upon exposure to light, in an amount of from about 0.001 to about 5 parts based on 100 parts by weight of the polymer composition (A), wherein a polymer segment comprising the components (a) and (c), which is insoluble in chloroform and 2,2,2-trifluoroethanol, is present in an amount greater than about 5 percent by weight based on the total weight of components (a), (c) and (d) in the polymer composition.

2. A polymer composition according to claim 1 wherein inorganic filler is titanium oxide having a mean particle size of about 0.5 micron or lower.

3. A polymer composition according to claim 1 wherein the inorganic filler is aluminum flake.

4. A polymer composition according to claim 1 wherein the inorganic filler is titanium oxide coated mica.

5. A polymer composition according to claim 1 wherein at least one comtatibilizer is present in an amount effective to improve the compatibility of the polyphenylene ether and the polyamide.

6. A polymer composition according to claim 5 wherein an impact strength improving polymer is present in an amount of from about 2 parts to about 30 parts by weight based on 100 parts by weight of the polyphenylene ether and the polyamide.

7. A polymer composition according to claim 6 wherein the inorganic filler other than metal flake is present in an amount of from about 3 to about 15 parts by weight based on 100 parts by weight of the polymer composition (A).

8. A polymer composition according to claim 6 wherein metal flake is present in an amount of from about 1 parts to about 5 parts by weight based on 100 parts by weight of the polymer composition (A).

9. A polymer composition according to claim 1 wherein the organic dye or pigment is present in an amount of from about 0.01 parts to 1 parts by weight based on 100 parts by weight of the polymer composition (A).

10. A polymer composition according to claim 1 wherein the polyphenylene ether is poly(2,6-dimethyl-1,4-phenylene ether).

11. A polymer composition which comprises
    (A) a polymer composition consisting of
        (a) at least one polyphenylene ether and,
        (b) optionally a styrene resin and,
        (c) at least one polyamide is present in an amount sufficient to constitute a continuous phase in the polymer composition and,
        (d) optionally one or more impact strength improving polymers and,
        (e) one or more agents to improve the compatibility of the polyphenylene ether and the polyamide, and
    (B) a combination of
        (a) at least one inorganic filler selected from the group consisting of titanium oxide, zinc oxide, zinc sulfide, aluminum oxide, magnesium oxide, titanium oxide coated mica, and metal particles and,
        (b) at least one organic dye or pigment selected from the group consisting of Solvent Yellow 44, Solvent Green 5, Pigment Yellow 83, and Solvent Yellow 105, which bleaches upon exposure to light, in an amount of from about 0.001 to about 5 parts based on 100 parts by weight of the polymer composition (A), wherein a polymer segment comprising the components (a) and (c), which is insoluble in chloroform and 2,2,2-trifluoroethanol, is present in an amount greater than about 5 percent by weight based on the total weight of components (a), (c) and (d) in the polymer composition.

12. A polymer composition according to claim 11 wherein polyamide 6 is present as a major constituent of the polyamides.

13. A polymer composition according to claim 11 wherein polyamide 66 is present as a major constituent of the polyamides.

14. A fabricated article for outdoor use made from a resin composition according to claim 1.

15. The polymer composition according to claim 1 wherein said agent to improve the compatibility is maleic anhydride.

16. A polymer composition which consists essentially of
    (A) a polymer composition consisting of
        (a) at least one polyphenylene ether and,
        (b) optionally a styrene resin and,
        (c) at least one polyamide and,
        (d) optionally one or more impact strength improving polymers and,
        (e) one or more agents to improve the compatibility of the polyphenylene ether and the polyamide, and
    (B) a combination of
        (a) at least one inorganic filler selected from the group consisting of titanium oxide, zinc oxide, zinc sulfide, aluminum oxide, magnesium oxide, titanium oxide coated mica, and metal particles and,
        (b) at least one organic dye or pigment selected from the group consisting of Solvent Yellow 44, Solvent Green 5, Pigment Yellow 83, and Solvent Yellow 105, which bleaches upon exposure to light, in an amount of from about 0.001 to about 5 parts based on 100 parts by weight of the polymer composition (A), wherein a polymer segment comprised of the components (a) and (c), which is insoluble in chloroform and 2,2,2-trifluoroethanol, is present in an amount greater than about 5 percent by weight based on the total weight of components (a), (c) and (d) in the polymer composition.

* * * * *